United States Patent [19]

Pickett et al.

[11] 4,169,058

[45] Sep. 25, 1979

[54] FILTER END CAP INTERFERENCE FIT STRUCTURE

[75] Inventors: Charles G. Pickett, North Plainfield; Donald A. Turk, Sewaren; Albert B. Walulik, Cranford; John G. Charney, Colonia, all of N.J.

[73] Assignee: Purolator, Inc., Rahway, N.J.

[21] Appl. No.: 871,930

[22] Filed: Jan. 24, 1978

[51] Int. Cl.² .............................................. B01D 27/06
[52] U.S. Cl. ............................ 210/440; 210/DIG. 17
[58] Field of Search ................ 210/130, 136, 440–444, 210/DIG. 17

[56] References Cited

U.S. PATENT DOCUMENTS

| 3,367,507 | 2/1968 | Hultgren | 210/443 |
| 3,370,708 | 2/1968 | Hultgren et al. | 210/130 |
| 3,502,218 | 3/1970 | Tuffnell et al. | 210/443 X |
| 4,035,306 | 7/1977 | Maddocks | 210/440 |

Primary Examiner—William A. Cuchlinski, Jr.
Attorney, Agent, or Firm—Staas & Halsey

[57] ABSTRACT

A filter end cap interference fit structure between the internal wall of a closed end pressure vessel and the outer circumference of an end cap for centering and maintaining a filter element in position internally of the pressure vessel. The structure is arranged so as to take up and account for any differences in manufacturing tolerances of the internal parts which could destroy the proper working relationship thereof. The internal parts are solidly secured between the closed dome end of the pressure vessel and the support mounting plate of the vessel to securely hold a filter element therebetween while assuring take-up of manufacturing tolerances.

11 Claims, 7 Drawing Figures

FIG. 5.
FIG. 6.
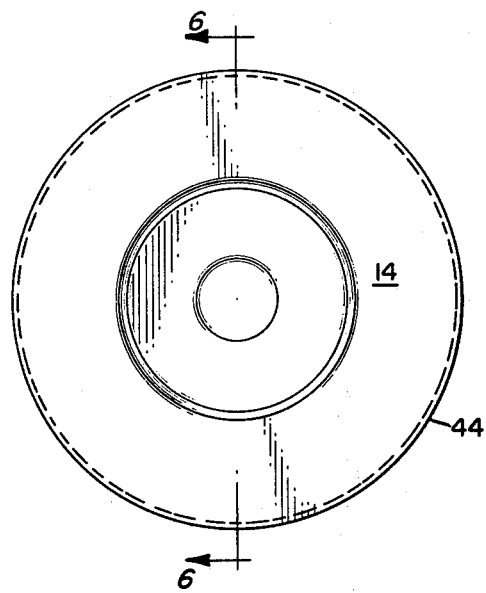
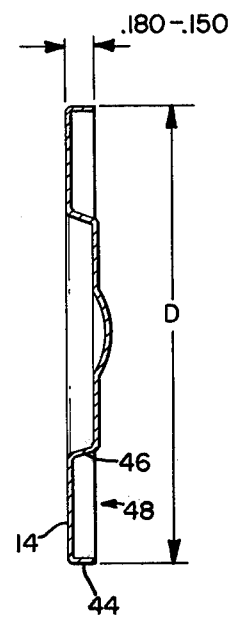
FIG. 7.
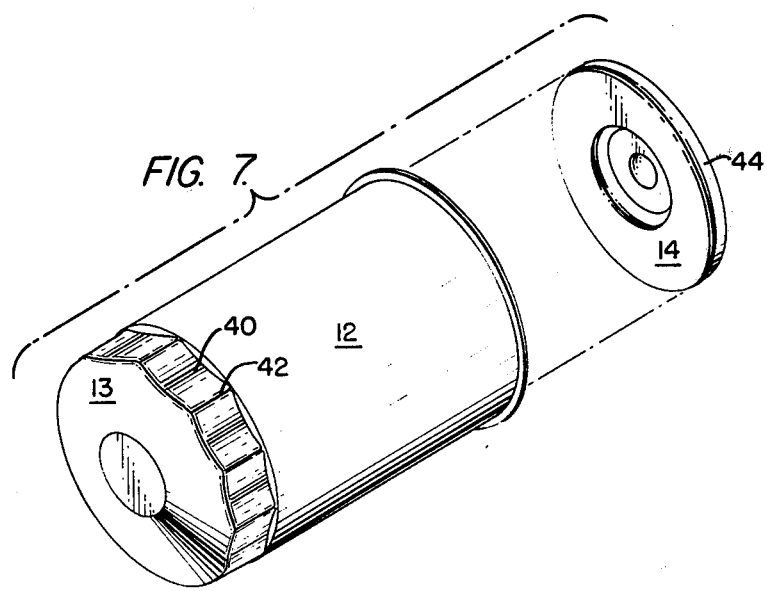

FILTER END CAP INTERFERENCE FIT STRUCTURE

BACKGROUND OF THE INVENTION

1. Field of the Invention

This invention relates generally to oil filter cartridges of the spin-on type and especially to structure for maintaining and securely holding a filter element of the spin-on cartridge between the internal end dome of the vessel and the other end support and mounting plate of the vessel.

2. Description of the Prior Art

A common problem with known type replaceable oil filter cartridges is that the internal parts are maintained in proper operating relationship by means of spring structure, either of coil or flat type, which when placed in the dome end of a filter housing or casing acts to load the internal parts against the engine end of the housing, thus assuring a tight seal between the internal filter element and the inlet and outlet port structure thereof. It is not uncommon to have manufacturing tolerances total as high as 0.125 inches of the internal parts which if a fixed point is chosen in the dome end of the casing or pressure vessel housing to hold those parts, when the supporting mounting plate is attached to the open end during assembly, the internal parts would fit too tight or too loose.

Another problem with known type devices is that the parts necessary to assure a relatively tight seal between the filter element and the oil openings associated therewith, within the overall oil filter cartridge, are fairly large in number which increases the expense of manufacture as well as the complexity thereof.

A further problem of known type internal filter and mounting structure is that there is no way of positively assuring that the necessary seal between the inlet and outlet ports associated with the filter will be maintained.

Known prior art patents which are pertinent to the disclosed invention are as follows.

The U.S. Pat. No. 3,984,318 discloses a plurality of tabs located around the periphery of an upper plate which engage a canister to provide for the necessary radial orientation of the component parts. It is not an interference fit structure like the subject invention.

U.S. Pat. No. 3,256,989 discloses a top end plate that is provided with a plurality of annularly extending radially spaced portions which engage the inside wall of the housing to prevent lateral displacement of the filter assembly during manufacture of the cartridge.

U.S. Pat. No. 3,397,786 discloses an end cap that is provided with an inturned rim and L-shaped spacing members which position the filtering element laterally with respect to the inner surface of the casing.

The U.S. Pat. No. 3,193,101 discloses top and bottom plates provided with encircling flanges having outwardly projecting ribs which contact the inner wall of the casing for centering the filter therein.

While the above noted patents teach the use of end caps provided with outwardly extending flanges which engage the inner surface of the filter case, none of them teach the "interference" fit type of structure such as is used in the invention disclosed herein.

None of these known prior art patents have the new and unique features of the invention set forth here within.

SUMMARY OF THE INVENTION

An object of the present invention is to provide a filter end cap interference fit structure within an oil filter pressure vessel which will assure a secure and proper fit of an oil filter element mounted within the pressure vessel.

Another object of the present invention is to provide a simple, easy to assemble, interference fit structure between the internal dome end of a pressure vessel and a filter element end cap supporting structure.

A still further object of the present invention is to provide an interference fit structure for supporting and properly aligning a filter element within a pressure vessel which will permit a number of different types, sizes and styles of overall spin-on type oil filter cartridges to be accurately and rapidly manufactured.

Another still further object of the present invention is to provide interference fit structure to replace conventional complicated structures requiring a number of additional parts with a more accurate and more simplified structural arrangement.

The device of this invention includes an end cap member for supporting one end of a filter element within a pressure vessel. The dome end of the pressure vessel is provided with specially configured and shaped structure at this dome end to provide a secure and positive retaining interference fit with the end cap. Thus, using the interference fit of this invention, the conventional type of spring retainer, either coil or flat type, is eliminated, with substantial improvement in both the resulting filter element fit, and also the secureness thereof. Also, once the overall filter cartridge is completed using the structure of this invention, the cartridge itself is less susceptible to damage, and inadvertent loosening or failure of the internal fit between the inlet and outlet ports as provided on the attaching end of the cartridge and the internal oil filter element therewithin. In other words, with the structure of this invention, even dropping the assembled oil filter cartridge from normal heights, will fail to dislodge or misalign the internal parts thereof. This is a great advantage in the field since dropping of the cartridges during installation is quite a common occurrence.

A primary purpose of this invention is to provide a secure assembly structure in which the internal parts are solidly affixed between the dome end of a pressure vessel and the mounting plate thereof. The internally mounted oil filter element is securely mounted and held within the pressure vessel in a manner which assures take-up of any manufacturing tolerances, and also ensures a proper seal between the respective inlet and outlet oil ports and openings. It is not uncommon to have manufacturing tolerances of the internal mounting parts in conventional type oil filter cartridges of as high as ¼ of an inch, and the structure of this invention will completely take up and provide for such a high range of tolerances.

In order to achieve this tight structural interference fit between the oil filter element end cap and the internal dome portion of the pressure vessel, the dome end of the pressure vessel is provided with an inwardly tapered portion having an angle of approximately 3° from the central longitudinal axis of the pressure vessel. Thus as the internal parts are assembled with the oil filter element mounted in the supporting recess of the end cap, the end cap is caused to slide longitudinally toward the closed dome end of the pressure vessel. As the external circumference of the end cap engages with the gradually reducing internal end of the pressure vessel, a tight and secure interference fit is achieved therebetween. The 3° taper is sufficiently gradual enough to permit a secure, tight interference fit, and yet permit the filter element end cap to move longitudinally just as far as is necessary to provide sufficient room for the oil filter element and to permit the tight securing of the centrally tapped mounting plate at the open end of the pressure vessel. Once the open end of the vessel is secured with the tapped attachment plate containing the oil inlet and outlet apertures, the oil filter element itself is securely mounted therewith internally of the pressure vessel.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an end view of the end cap per se of the interference fit structure.

FIG. 6 is an elevational view, partly in cross section, taken generally along line 6—6 of FIG. 5.

FIG. 7 is a perspective view of the pressure vessel filter shell and the end cap in exploded position prior to assembly thereof.

DESCRIPTION OF THE PREFERRED EMBODIMENT

Figure 1:
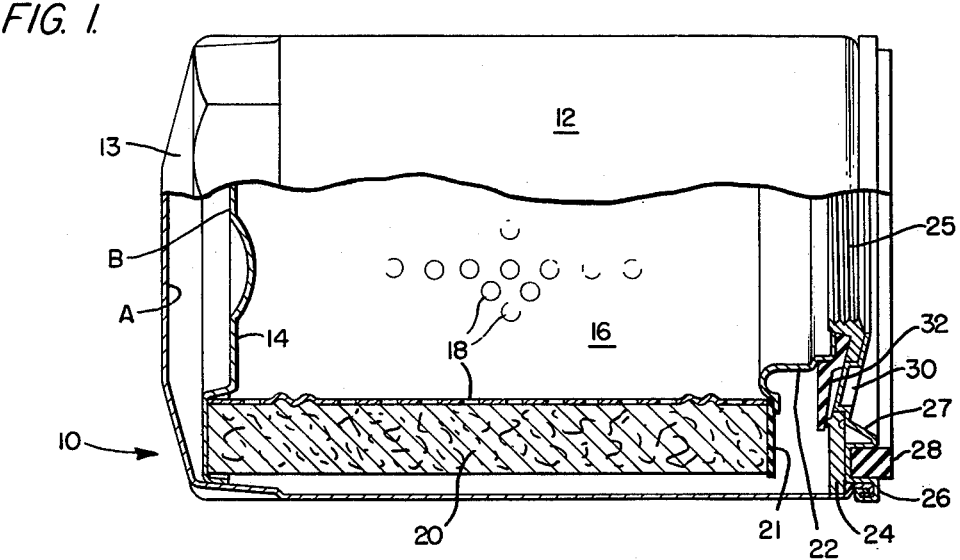
FIG. 1 is a side elevational view, partly in cross section, of the interference fit of this invention as used with an oil filter element within a spin-on type oil cartridge filter.

Referring to FIG. 1 of the drawings, reference numeral 10 indicates in general a throw away type oil filter cartridge incorporating the interference fit structure of this invention. The throw away type oil filter cartridge 10 has a pressure vessel outer filter shell 12 containing therewithin a filter element end cap 14, a central filter element oil flow tube 16 with holes 18 to permit the oil flow therethrough. The filter element itself 20 is normally provided with another end disc 21 and supported by an end centering element 22. The end centering element 22 is normally fastened to the filter shell closure plate 24 by means of overlapping and metal folded portions 26. Overlapping portions 26 are formed by the open filter shell 12 circumferential edge being folded together with the circumferential flange extending from the gasket retainer 27. The gasket retainer 27 also supports the engine block engaging gasket 28 to effect an oil tight seal between the overall cartridge and the engine block. The mounting plate 24 is normally provided with a tapped central aperture 25 for spin-on screwing of the overall filter cartridge to an appropriate engine block oil feed nipple. A plurality of oil inlet holes 30 also are provided, which are spaced around the central aperture 25 in conventional manner. Also, a back flow gasket member 32 is normally provided to prevent the oil from returning to the engine through the inlet openings 30. In conventional known type spin-on filters, a spring is commonly provided between the inside internal dome end A of the filter shell 12, and the surface B of an end cap for supporting the filter element. Because of the interference fit structure of this invention, this spring is eliminated.

Figure 2:
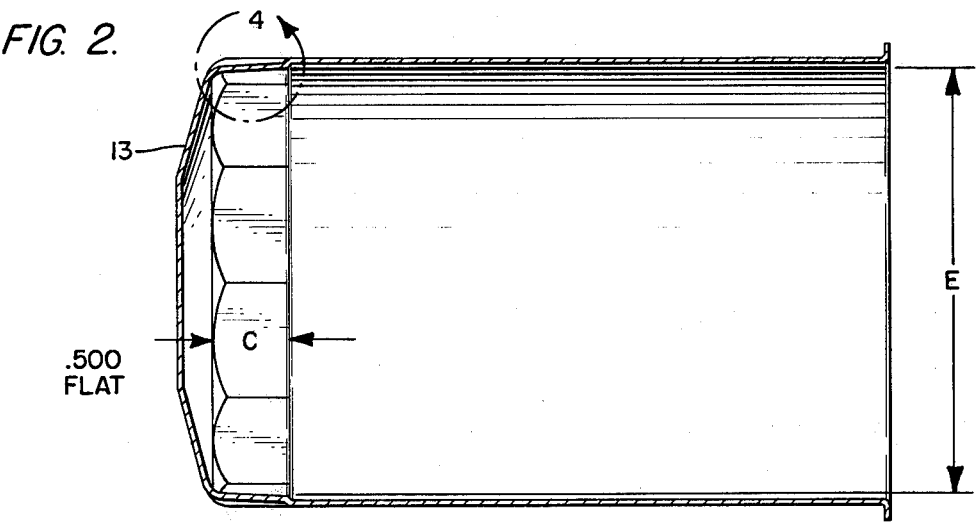
FIG. 2 is a cross sectional elevational view of the pressure vessel filter shell per se.
Figure 3:
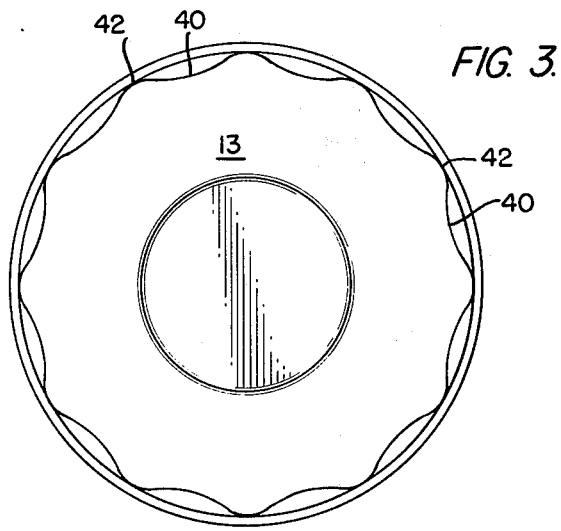
FIG. 3 is an end view as seen from the left of the pressure vessel of FIG. 1.
Figure 4:
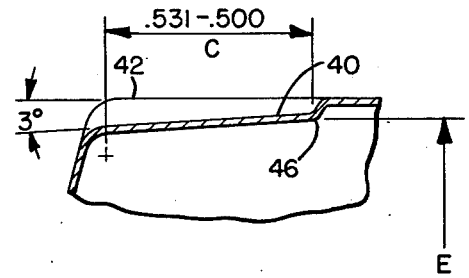
FIG. 4 is an enlarged portion, partly in cross section, of the encircled portion 4 of FIG. 2.

Looking at FIGS. 2, 3 and 4, the interference fit structure for the pressure vessel 12 will now be described in detail. The closed end 13 of the pressure vessel 12 is of generally dome configuration and provided with a portion C of approximately 0.5 inches. It has been discovered by the inventors that 0.5 to 0.531 inches provides the desired range of size for proper use of this invention. Over this portion C of the dome end, an inwardly taper of approximately 3° towards the closed end of the vessel is provided. FIG. 4 shows this 3° taper of the inner portions 40 of the flutes 40, 42. As shown in FIG. 3, twelve flute portions are provided for this example. However, the inventors have also discovered that as few as eight flutes may be provided with satisfactory results of the interference structure of this invention. Also, the entire circumference of the dome end may be provided with the inward 3° taper and no flutes whatsoever being apparent. That is, this invention encompasses a range of at least eight flutes to infinity, i.e. no flutes whatsoever being visible, but merely an inwardly 3° taper to the closed end. However, whatever number of flutes, from eight to a maximum number approaching infinity, or in essence, no flutes whatsoever being provided, it is important to have the minimum distance C of at least ½ inch.

Looking at FIGS. 5 and 6, the filter element end cap support member may be seen. This end cap 14 is normally provided with an outer lip portion 44 and an inner centrally raised portion 46 to provide a filter element and engaging channel 48 therebetween. The sizing for the outer surface of the circumferential lip 44, indicated by D, must be just slightly less than the internal circumference of the beginning of the tapered portion C of the pressure vessel, indicated at E in FIGS. 2 and 4. Thus, with this slight difference in size between the outer circumference of lip 44 and the inner circumference of the largest end of the tapered portion C of the pressure vessel, the filter element end cap 14 may be easily slipped into the pressure vessel 12 as best seen in the exploded view of FIG. 7. Normally a thousandth of an inch or so is sufficient minimum clearance while a much greater maximum clearance is permitted which will be absorbed and eliminated by the interference fit of this invention. When the filter element end cap 14 is inserted toward the closed end 13 of the pressure vessel 12, it will come to rest upon engagement with the inner leading edges 46 of the tapered portion C. At this point, with a filter element 16, 18, 20 inserted in the channel 48 of the end cap, further pressure on the cap during assembly of the above-described elements 24 through 28 as the filter is completed will cause the end cap 14 to move toward the closed end 13 of the pressure vessel. Thus, because of the 3° taper of portion C of the filter pressure vessel 12, a secure and tight fit of all of the internal elements of the overall filter cartridge is assured. Lip 44 preferably is from 0.150 to 0.180 inches in width as shown in FIG. 6, and extends axially from end cap 14.

This invention eliminates previous spring elements of prior known filter cartridges of the spin-on type, while greatly improving the ease of assembly and speed thereof. It also assures a positive, secure type fit of all of the internal parts, and a positive seal between the oil inlet and outlet portions of the filter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A filter structure comprising: a pressure vessel having an open and a closed end for receiving a filter element therewithin, an end cap for engaging and centering one end of said filter element within said pressure vessel, means for providing a self adjustable interference fit between the closed end of the pressure vessel and said end cap, said means for providing said self adjustable interference fit includes a short gradually reduced portion around the inner circumference of the closed end of the pressure vessel formed with a tapering angle towards the closed end thereof and a lip around the circumference of said end cap, and said end cap engages the tapered portion without reaching the end of said tapered portion.

2. The structure as set forth in claim 1, wherein said tapering end angle is approximately 3°.

3. The structure as set forth in claim 2, wherein the short length of the tapered portion is approximately ½ an inch to provide sufficient length for a secure yet easily assembled interference fit between the inner circumference of said tapered portion and the lip around the circumference of the filter element end cap.

4. The structure as set forth in claim 3, wherein the reduced portion includes a plurality of flutes.

5. The structure as set forth in claim 4, wherein at least eight flutes are provided circumferentially around the closed dome end of the pressure vessel.

6. A filter structure comprising: an end cap for a filter element to be mounted in a pressure vessel consisting of a plate member having a centrally raised portion of slightly smaller diameter than the central internal diameter of a filter element, and axially extending lip portion provided on the outer circumference of said plate member, a channel formed between said central raised portion and the lip portion of said plate member to provide a reception channel for one end of an oil filter element, the external diameter of said axial lip portion being of a slightly less dimension than an internal diameter of a closed end portion of a pressure vessel, a pressure vessel of the closed end type, said closed end of said pressure vessel being provided with a short inwardly extending taper of a pre-determined configured angle for self-adjusting mating with the lip of said filter element plate member, and said end cap engages the tapered portion without reaching the end of said tapered portion.

7. The structure as set forth in claim 6, wherein said pre-determined angle is approximately 3°.

8. The structure as set forth in claim 6, wherein the short tapered portion of said closed end pressure vessel is approximately ½ inch in width.

9. The structure as set forth in claim 8, wherein the short tapered portion extends smoothly around the entire circumference of the closed end pressure vessel.

10. The structure as set forth in claim 8, wherein the short tapered portion of said closed end pressure vessel is provided with alternating indentations and raised portions around the circumference thereof.

11. The structure as set forth in claim 10, wherein at least eight of said indentations and raised portions are provided around the circumference of said pressure vessel.

* * * * *